United States Patent
Korol

(10) Patent No.: US 11,254,053 B2
(45) Date of Patent: Feb. 22, 2022

(54) HIGH RESOLUTION THREE-DIMENSIONAL PRINTING SYSTEM

(71) Applicant: 3D Systems, Inc., Rock Hill, SC (US)

(72) Inventor: Evgeny Korol, San Diego, CA (US)

(73) Assignee: 3D Systems, Inc., Rock Hill, SC (US)

(*) Notice: Subject to any disclaimer, the term of this patent is extended or adjusted under 35 U.S.C. 154(b) by 125 days.

(21) Appl. No.: 16/804,830

(22) Filed: Feb. 28, 2020

(65) Prior Publication Data

US 2020/0276759 A1 Sep. 3, 2020

Related U.S. Application Data

(60) Provisional application No. 62/811,620, filed on Feb. 28, 2019.

(51) Int. Cl.
| | |
|---|---|
| *B29C 64/273* | (2017.01) |
| *B29C 64/393* | (2017.01) |
| *B23K 26/06* | (2014.01) |
| *B29C 64/232* | (2017.01) |
| *B29C 64/245* | (2017.01) |

(Continued)

(52) U.S. Cl.
CPC ........ *B29C 64/273* (2017.08); *B23K 26/0643* (2013.01); *B29C 64/205* (2017.08); *B29C 64/232* (2017.08); *B29C 64/245* (2017.08); *B29C 64/393* (2017.08); *B33Y 10/00* (2014.12); *B33Y 30/00* (2014.12); *B33Y 50/02* (2014.12)

(58) Field of Classification Search
CPC ................................................ B23K 26/0643
See application file for complete search history.

(56) References Cited

U.S. PATENT DOCUMENTS

| | | |
|---|---|---|
| 5,247,180 A | 9/1993 | Mitcham et al. |
| 5,260,009 A | 11/1993 | Penn |

(Continued)

FOREIGN PATENT DOCUMENTS

| | | |
|---|---|---|
| EP | 0933925 A2 | 8/1999 |
| EP | 2312390 B1 | 12/2015 |

(Continued)

OTHER PUBLICATIONS

International Searching Authority; International Search Report for International Application No. PCT/US2020/0520384; dated Jun. 26, 2020.

(Continued)

*Primary Examiner* — Atul P. Khare

(57) ABSTRACT

A three-dimensional printing system for fabricating a three-dimensional article includes a motorized build platform, a dispensing module, a pulsed light source, an imaging module, a movement mechanism, and a controller. The imaging module receives radiation from the pulsed light source and includes a two-dimensional mirror array. The movement mechanism imparts lateral motion between the imaging module and the build platform. The controller is configured to operate the motorized build platform and the dispensing module to form a layer of build material at a build plane, operate the movement mechanism to laterally scan the imaging module over the build plane, operate the pulsed light source to generate a sequence of radiation pulses that illuminate the mirror array, and operate the mirror array to selectively image the build material.

20 Claims, 3 Drawing Sheets

(51) Int. Cl.
*B29C 64/205* (2017.01)
*B33Y 10/00* (2015.01)
*B33Y 30/00* (2015.01)
*B33Y 50/02* (2015.01)

(56) References Cited

U.S. PATENT DOCUMENTS

| | | | |
|---|---|---|---|
| 6,051,179 A | 4/2000 | Hagenau | |
| 7,088,432 B2* | 8/2006 | Zhang | G03F 7/70291 |
| | | | 355/77 |
| 7,259,830 B2* | 8/2007 | Ishii | G03B 27/54 |
| | | | 355/53 |
| 8,139,202 B2* | 3/2012 | Henningsen | G02B 6/0008 |
| | | | 355/71 |
| 8,636,496 B2 | 1/2014 | Das et al. | |
| 9,073,261 B2 | 7/2015 | El-Siblani et al. | |
| 9,075,409 B2 | 7/2015 | El-Siblani et al. | |
| 9,403,322 B2 | 8/2016 | Das et al. | |
| 9,561,622 B2 | 2/2017 | Das et al. | |
| 9,606,343 B2 | 3/2017 | Sheblee et al. | |
| 9,632,420 B2 | 4/2017 | Allanic | |
| 10,232,553 B2* | 3/2019 | Joyce | B29C 64/393 |
| 10,336,055 B2 | 7/2019 | Das et al. | |
| 10,399,179 B2* | 9/2019 | Harding | B23K 26/0643 |
| 10,884,250 B2* | 1/2021 | Chen | G02B 27/0944 |
| 2003/0214571 A1 | 11/2003 | Ishikawa | |
| 2005/0094246 A1 | 5/2005 | Roberts | |
| 2016/0303797 A1 | 10/2016 | Moran | |
| 2016/0311160 A1 | 10/2016 | Nam et al. | |
| 2018/0161925 A1 | 6/2018 | Harding | |
| 2019/0091988 A1 | 3/2019 | Das et al. | |
| 2020/0108464 A1* | 4/2020 | Shibazaki | B23K 26/342 |
| 2020/0122394 A1 | 4/2020 | Sheng et al. | |
| 2021/0229215 A1* | 7/2021 | Weston | B23K 26/0648 |
| 2021/0331252 A1* | 10/2021 | Chang | B22F 10/36 |

FOREIGN PATENT DOCUMENTS

| | | |
|---|---|---|
| WO | WO2016107798 A1 | 7/2016 |
| WO | WO2016107800 A1 | 7/2016 |
| WO | WO2016124634 A1 | 8/2016 |
| WO | WO2017055747 A1 | 4/2017 |

OTHER PUBLICATIONS

Zhou, Chi and Chen, Yong; Additive Manufacturing Based on Optimized Mask Video Projection for Improved Accuracy and Resolution; Journal of Manufacturing Processes 14 (2012) 107-118.

* cited by examiner

HIGH RESOLUTION THREE-DIMENSIONAL PRINTING SYSTEM

CROSS-REFERENCE TO RELATED APPLICATIONS

This non-provisional patent application claims priority to U.S. Provisional Application Ser. No. 62/811,620, Entitled "HIGH RESOLUTION THREE-DIMENSIONAL PRINTING SYSTEM" by Evgeny Korol, filed on Feb. 28, 2019, incorporated herein by reference under the benefit of U.S.C. 119(e).

FIELD OF THE INVENTION

The present disclosure concerns a three dimensional (3D) printer for manufacturing an article in a layer-by-layer process. More particularly, the 3D printer has an imaging system that selectively images layers with very high resolution.

BACKGROUND

Three dimensional (3D) printing systems are in rapidly increasing use for manufacturing three dimensional articles of varying composition. Some of these three dimensional printing systems utilize the application of energy to selectively cure or fuse materials. The energy is applied using imaging systems such as lasers. There is an ongoing need to improve both resolution and speed of the imaging systems.

SUMMARY

Figure 1:
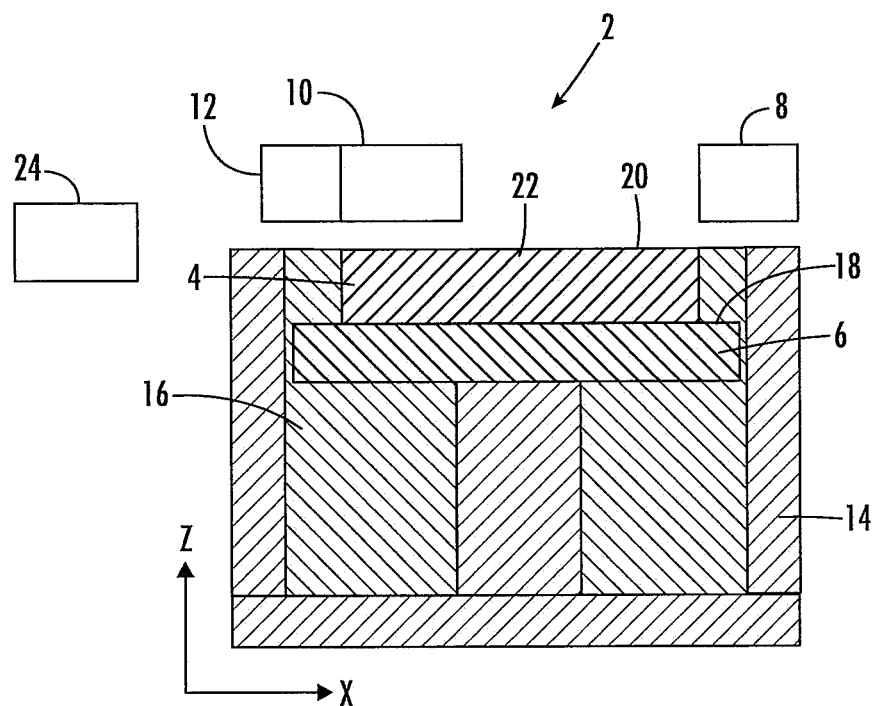
FIG. 1 is a schematic diagram of a three-dimensional printing system for fabricating a three-dimensional article.

In a first aspect of the disclosure, a three-dimensional printing system for fabricating a three-dimensional article includes a motorized build platform, a dispensing module, a pulsed light source, an imaging module, a movement mechanism, and a controller. The imaging module receives radiation from the pulsed light source and includes a two-dimensional mirror array defining N rows and M columns of mirrors. The movement mechanism imparts motion between the imaging module and the build platform in one or two lateral directions. The controller is configured to operate the motorized build platform and the dispensing module to form a layer of build material at a build plane, operate the movement mechanism to scan the imaging module along an X-axis over the build plane at a velocity V, operate the pulsed light source to generate a sequence of radiation pulses that illuminate the mirror array, and operate the mirror array to selectively image the build material. The radiation pulses individually having a time duration of $\delta T$. The radiation pulses are emitted at a frequency of $v=1/T$. During a single scan of the imaging module across the build plane, a location on the build plane is addressed by a plurality of different mirrors. The individual mirrors are controlled to have one of an ON state and an OFF state during the pulses. The pulsed light source can be integrated into the imaging module.

A redundancy R is a number of mirrors (or mirror images) that address a given point on the build plane. A number n equals N divided by R and therefore equals a number of mirror images that pass a given point during the time period T. A larger value of redundancy R allows more gray levels at a given location on the build plane. A larger value of R also reduces an effect of a malfunctioning mirror element. In some embodiments, at least five mirrors address a given point on the build plane. The value of R can be more than five, more than ten, more than 25, more than 50, more than 100 or any value that is optimized or preferred for a given system.

In one implementation, N and M are individually at least equal to 500. N can be at least equal to 1000 or equal to 1080. M can be at least equal to 1000 or 2000 or equal to 1920.

In another implementation, the radiation pulse period T is at least two times the pulse width $\delta T$ or five times $\delta T$ or ten times $\delta T$ or 100 times $\delta T$ or 1000 times $\delta T$. In one particular example, T is about 0.1 milliseconds (pulse frequency $v=1/T$ of about 10 KHz) and the pulse width $\delta T$ is about 15 nanoseconds.

In yet another implementation, individual mirrors have a lateral dimension of S. The imaging module includes expansion or reduction optics that project an image of individual mirrors onto the build plane with a lateral dimensions of s in which s=S*r or in which s=S times r. If the factor r is less than one, then an image of a mirror in the build plane has a lateral dimension s that is less than the actual mirror dimension S. If the factor r equals one, then an image of a mirror in the build plane has a lateral dimension s that is equal to the actual mirror dimension S. If the factor r is greater than one, then an image of a mirror in the build plane has a lateral dimension s that is greater than the actual mirror dimension S. The velocity V equals (n times s) divided by T.

In a further implementation, mirror transitions between the ON and OFF state occur during a dark state of the pulsed light source between pulses. As a result, the mirror states are static during a light pulse. This eliminates transitions during pulses which improves a contrast ratio for the imaging module.

DETAILED DESCRIPTION OF THE PREFERRED EMBODIMENTS

FIG. 1 is a schematic diagram of a three-dimensional printing system 2 for fabricating a three-dimensional article 4. In describing system 2, mutually perpendicular axes X, Y, and Z can be used. The X-axis and the Y-axis are lateral axes that are generally horizontal. The Z-axis is a vertical axis that is generally aligned with a gravitational reference. The use of the word "generally" indicates to within manufacturing tolerances. For example, generally aligned means aligned to within manufacturing tolerances with an intent to be aligned. As another example, generally equal means equal to within manufacturing tolerances.

System 2 includes a motorized build platform 6, a dispensing module 8, an imaging module 10, and a movement mechanism 12. In the illustrated embodiment, system 2 also includes a housing 14 containing a photocurable resin or build material 16. The motorized build platform 6 is operable to raise and lower an upper surface 18 of the build platform 6 so that a desired upper face 20 of the article 4 can be positioned at a build plane 22 defined by the imaging module 10. The movement mechanism 12 is configured to impart relative lateral motion between the imaging module 10 and the build platform 6 in either one or two lateral directions. In the illustrated embodiment, the dispensing module 8 includes a roller and/or wiper to provide a thin layer of the build material 16 at the build plane 22. In an alternative embodiment, the dispensing module 8 can be a piezo inkjet printhead that selectively dispenses the build material 16 at the build plane 22. When the dispensing module 8 is an inkjet printhead, it can also dispense a sacrificial support material that supports the build material 16.

System 2 also includes a controller 24 coupled to the motorized build platform 6, the dispensing module 8, the imaging module 10, and the movement mechanism 12. Controller 24 includes a processor coupled to an information storage device. The information storage device includes a non-transient or non-volatile storage device storing software instructions. When executed by the processor, the software instructions control portions of the system 2.

To fabricate the article 4, the controller is configured to: (1) operate the motorized build platform 6 to position the upper surface 18 (or upper face 20) at the build plane 22; (2) operate the dispensing module 8 to form a layer of build material 16 over the top surface 18 (or upper face 20); (3) operate the movement mechanism 12 to scan the imaging module 10 over the build plane 22; (4) while the imaging module 10 is scanning, operate the imaging module 10 to selectively harden the layer of build material 16 at the build plane 22; and (5) repeat steps (1)-(4) to compete fabrication of article 4.

Figure 2:
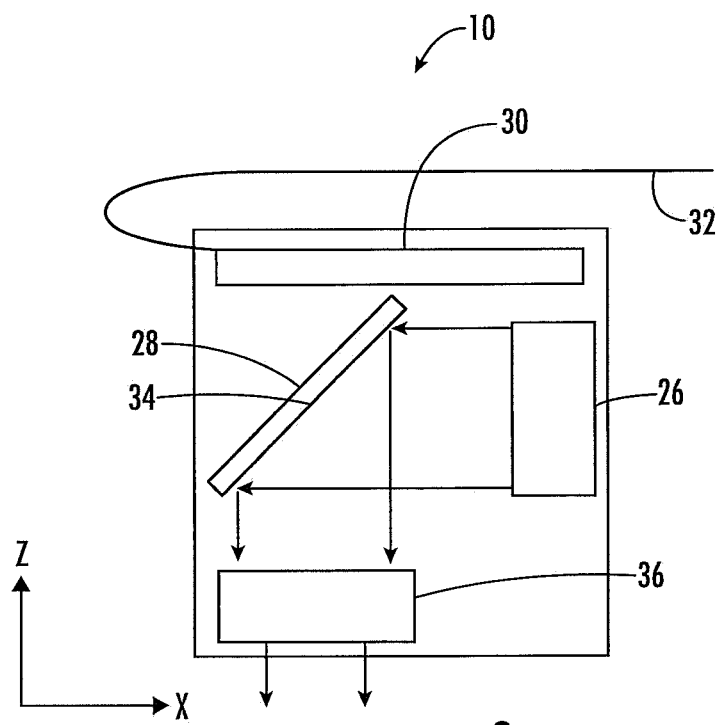
FIG. 2 is a schematic cross-section of an embodiment of an imaging module that can be used in the system of FIG. 2.

FIG. 2 is a schematic cross-section of an embodiment of the imaging module 10. Imaging module 10 includes a pulsed light source 26 and a spatial light modulator 28 controllably coupled to a driver board 30. The driver board 30 is coupled to the controller 24 via a trailing cable 32. The trailing cable 32 allows the imaging module to scan over the build plane 22. In some embodiments, signals can be wirelessly transmitted between controller 24 and driver board 30.

The pulsed light source 26 includes an array of blue or ultraviolet lasers or LEDs (light emitting diodes). The spatial light modulator 28 includes a rectangular array of controllable mirrors (mirror array 34). Radiation from the pulsed light source 36 impinges upon and illuminates the mirror array 34 which then reflects the radiation into optics 36. Optics 36 projects an image 38 of the illuminated mirror array 34 onto the build plane 22. In one embodiment optics 36 are reduction optics whereby the image 38 is smaller in extent than the mirror array 34. In another embodiment, optics 36 project an image 38 with the same extent as the mirror array 34. In yet another embodiment, optics 36 are expansion optics whereby the image 38 is larger in extent than the mirror array 34. In some embodiments, optics 34 can enlarge and/or reduce the image 38 along one axis differently than the other.

As the imaging module 10 scans over build plane 22, the pulsed light source 26 is pulsed while individual mirrors of the mirror array 34 are actuated between ON and OFF states. Pulsed means that the light source is outputting a sequence of light pulses individually having a pulse width $\delta T$ and spaced by a time period T. In some embodiments, T is at least two times $\delta T$. The frequency $\nu$ of pulsing is equal to $1/T$. Between pulses is a "dark" state of the pulsed light source 26. An ON state of a mirror is a state in which light is reflected from the light source 26 to the build plane 22. An OFF state is a state in which light from the light source 26 is not reflected into the build plane 22. Preferably transitions between the ON and OFF states are performed during the dark state of the pulsed light source so that a contrast ratio between ON and OFF states of the imaging module is maximized.

Figure 3:
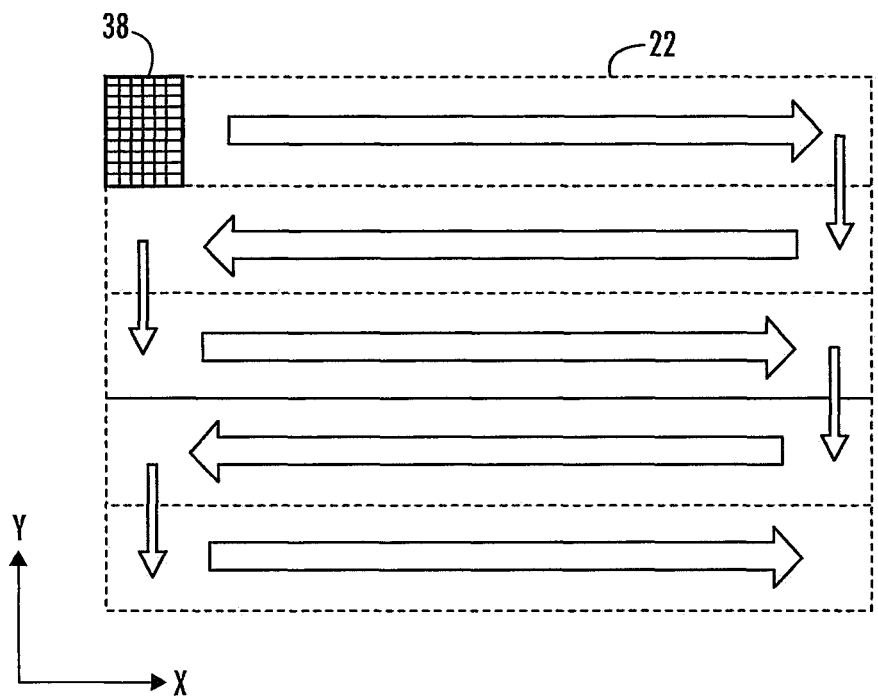
FIG. 3 is a diagram depicting imaging a build plane with a scanning imaging module.

FIG. 3 is a diagram depicting imaging the build plane 22. Element 38 depicts a projection of the mirror array 34 onto the build plane. Image 38 may be actual size, reduced, or enlarged relative to the original dimensions of the mirror array 34. The image 38 scans along the scan axis X. In an embodiment, the image 38 is a rectangular image of at least one hundred thousand mirrors. The image 38 is defined by N rows that are arranged along X and M columns that are arranged along Y. In one embodiment, N=1080 rows of mirrors and M=1920 columns of mirrors for a total of more than 2 million individually controllable mirrors. Other embodiments are possible.

In the illustrated embodiment, the image 38 is: (1) scanned from left to right along X, (2) shifted in Y (-Y direction in the illustration), (3) scanned from right to left in X, and so on according to the figure. This is but one example. In another embodiment, the image 38 is wide enough along Y to span the entire build plane 22. Then the image 38 only needs to scan along X once to image the entire build plane 22. In some embodiments, the scans can overlap to allow different portions of the image 38 to cover the same scanned positions in Y.

Figure 4:
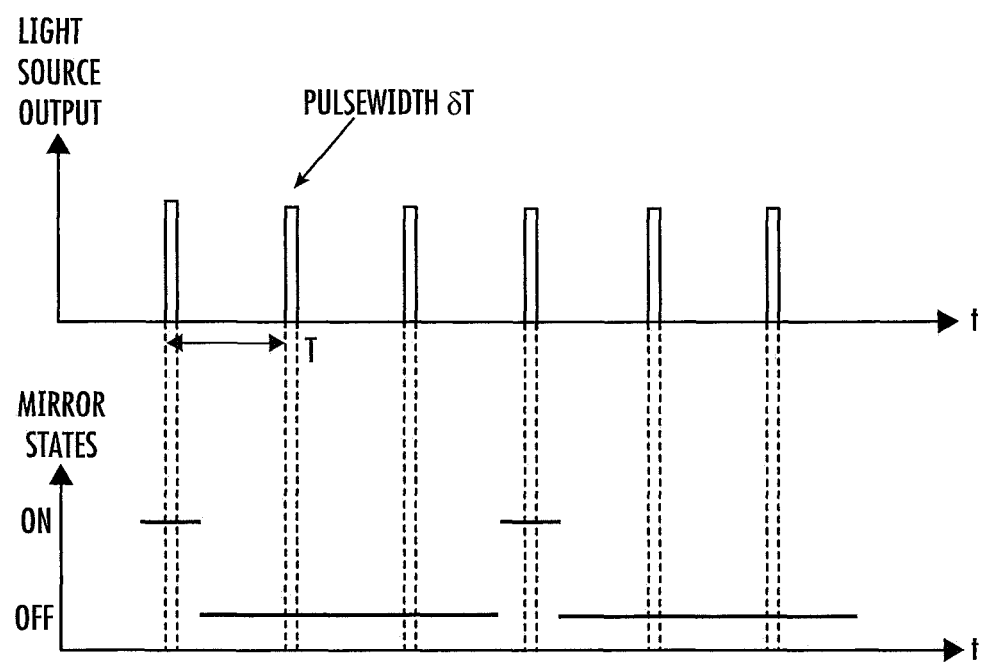
FIG. 4 is a timing diagram depicting a pulsed light source output (top) and mirror states for a mirror. Mirror transitions occur temporally between pulses.

The image 38 is a pulsed image because the light source 26 is pulsed. This is illustrated in FIG. 4. The top portion of FIG. 4 illustrates the pulsed light source 26 output versus time during a scan. Individual pulses have a pulse width of $\delta T$ with a pulse frequency $\nu$ defining a time period T from the start of one pulse to the start of the next pulse. In some embodiments, time period T is at least 5 times $\delta T$. More particularly, T is at least 10, at least 100, or at least 1000 times $\delta T$. In one particular embodiment, $\delta T$ is about 15 nanoseconds and T is about 0.1 milliseconds but such parameters can vary. The lower graph of FIG. 4 depicts a mirror transition timing diagram for a single mirror. The mirrors that are selectively ON (to image the build material) have an ON state that overlaps and temporally contains a pulse. Thus, the mirror transitions from ON to OFF or OFF to ON occur during the dark state of the pulsed light source between the pulses. This improves the contrast ratio of the imaging module 10, because there are no intermediate mirror states during light pulses.

Figure 5:
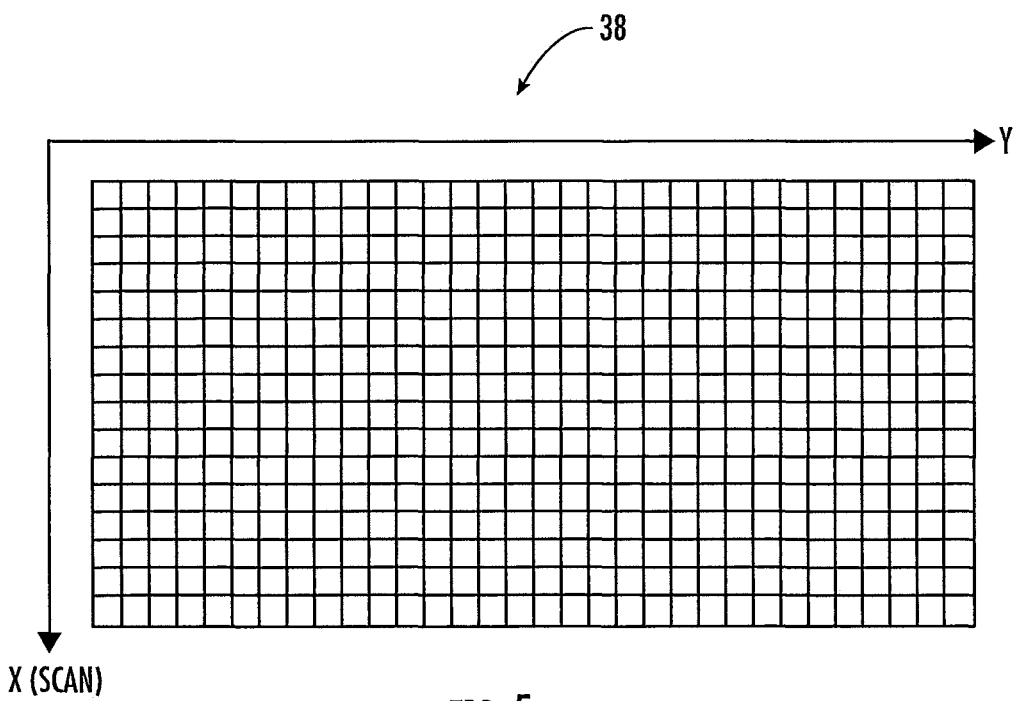
FIG. 5 is a simplified diagram depicting an image of a mirror array as it is projected onto a build plane. The diagram is simplified because a typical image would be for a mirror array having more than 100,000 individual mirrors.

FIG. 5 depicts an enlarged but simplified view of the image 38 of the mirror array 34. It is simplified since N and M are individually greater than 500. At the top of each column is a mirror with row number 1. At the bottom of each column is a mirror with row number N. As the image 38 scans over the build plane 22 a light pulse causes row 1 to image a certain row r=1 of locations of the build plane 22. Then the mirrors "go dark" until the next pulse at which row 1 images a row 1+n. The number n is a measure of how far the image 38 translates or scans along X between pulses. In summary, we can have the following definitions:

N=number of rows of mirrors (or mirror images) along X.
M=number of columns of mirrors along Y.
S=Actual mirror pitch across mirror array 34.

r=Expansion/Reduction Factor. For example, when r=0.2, the size of the image 38 is reduced by a factor of 5 (reduced by 80%) along the axis X and the axis Y. In some embodiments, r can be different for X and Y.

s=S*r=Pixel pitch for the image 38. If r is different for X and Y, then s will also be different along X and Y.

T=Time between pulses, Frequency ν=1/T, Pulse Width is δT

V=Scan Speed

R=Redundancy=Number of mirrors that can address the same point on the build plane 22 n=N/R=Number of mirrors that pass a point on the image plane between pulses $$V=(n*s)/T$$

An illustrative example follows.

$$N \times M = 1000 \times 2000$$

S=25 microns
r=0.2 so that s=S*r=5 microns
Pulse Width is 15 nanoseconds
Pulse Frequency is 10 KHz so that T is 0.1 milliseconds
R=Redundancy=100
n=N/R=1000/100=10 mirror lengths $$V=n*s/T=(10 \text{ mirror lengths} *5 \text{ microns})/0.1 \text{ milliseconds}=0.5 \text{ meter/second}$$

The redundancy R allows for varying gray levels. Also, a damaged mirror will only have a 1% impact on a given pixel.

Figure 6:
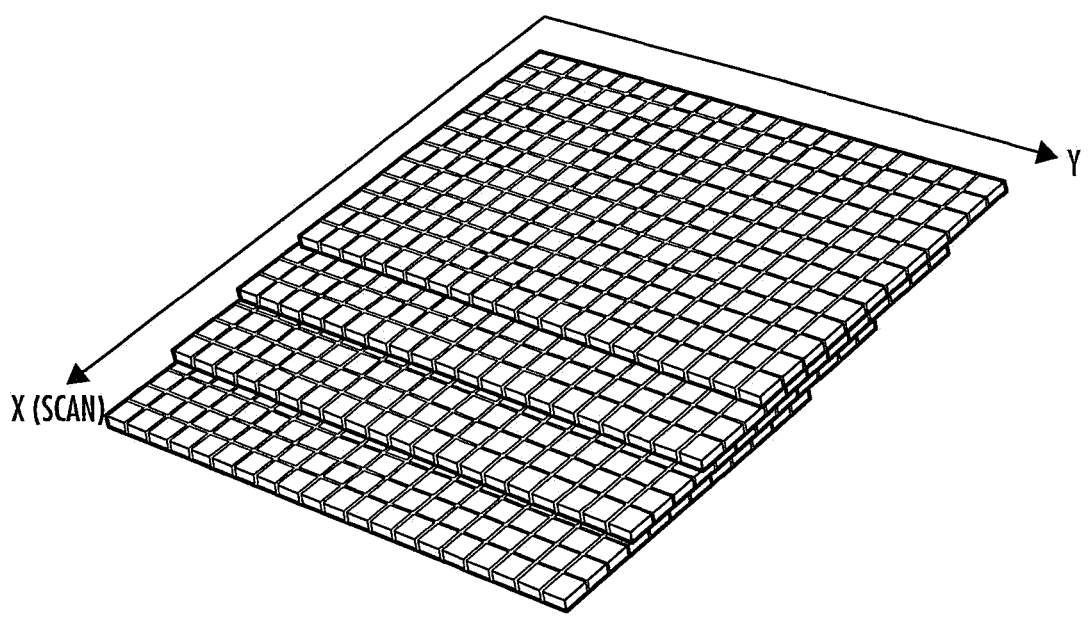
FIG. 6 is an illustration of images for which n (the number of mirrors lengths of travel during a dark state) equals 3.

FIG. 6 is an illustration that illustrates the temporal mirror pulsing as a physical overlay. The top layer represents the first pulse. Then, the next layer down represents the next pulse, and so on. Layer to layer represents the "dark state". This represents a value of n=3; the image 38 advances three mirror lengths between pulses for illustrative purposes since n can take on values that are much larger than 3.

In some embodiments, the period T is not "fixed" but is based upon advancement of the imaging module 10. The light pulses can be generated in response to an encoder signal that is used for motion control of the imaging module 10 along the X direction. Mirror transitions of mirror array 34 can also be synchronized based upon the encoder signal. There are varying ways in which the controller can synchronize motion of the imaging module 10, pulses generated by light source 26, and transitions of the mirrors within the mirror array 34 that do not depart from the claims.

The specific embodiments and applications thereof described above are for illustrative purposes only and do not preclude modifications and variations encompassed by the scope of the following claims.

What is claimed:

1. A three-dimensional printing system for fabricating a three-dimensional article, the system comprising:
   a motorized build platform;
   a dispensing module;
   an imaging module including:
      a pulsed light source; and
      a two-dimensional mirror array defining N rows and M columns of mirrors;
   a housing containing a photocurable build material;
   a movement mechanism for imparting lateral motion for scanning the imaging module over the build platform; and
   a controller configured to:
      operate the motorized build platform and the dispensing module to form a layer of the build material at a build plane on the build platform;
      operate the movement mechanism to scan the imaging module over the build plane at a velocity V;
      operate the pulsed light source to generate a sequence of radiation pulses that illuminate the mirror array so that during a single scan of the imaging module, a given point on the build plane is addressed by a plurality of different ones of the mirrors according to a redundancy R selected to provide gray levels of curing for the build material while other points on the build plane are addressed by other ones of the mirrors; and
      operate the mirror array to selectively image the build material at the build plane by controlling individual ones of the mirrors to have one of an ON state and an OFF state during each of the pulses.

2. The three-dimensional printing system of claim 1 wherein the imaging module includes projection optics that project light reflected by the mirror array onto the build plane.

3. The three-dimensional printing system of claim 2 wherein the projection optics generate an image on the build plane that is expanded or reduced relative to a dimensional extent of the mirror array.

4. The three-dimensional printing system of claim 1 wherein N is at least 500.

5. The three-dimensional printing system of claim 1 wherein the mirrors of the mirror array transition between ON and OFF states during a dark state of the pulsed light source between selected ones of the pulses.

6. The three-dimensional printing system of claim 1 wherein during the single scan the given point on the build plane is addressed by at least 10 of the mirrors.

7. The three-dimensional printing system of claim 1 wherein the redundancy R represents the number of mirrors addressing the given point on the build plane, and wherein for a given scan of the imaging module, the given point on the build plane is addressed by R mirrors with a fraction of the R mirrors in the ON state providing the gray levels for curing at the given point.

8. The three-dimensional printing system of claim 1 wherein the radiation pulses each have a duration δT and a period T of at least two times δT.

9. The three-dimensional printing system of claim 1, further comprising:
   the N rows of mirrors arranged along an X-axis and the M columns of mirrors arranged along a Y-axis transverse to the X-axis;
   wherein the controller is further configured to:
      operate the movement mechanism to scan the imaging module along the X-axis over the build plane at the velocity V;
      operate the pulsed light source to generate the radiation pulses that illuminate the mirror array such that V=(n*s)/T, whereby n=N/R, s= an imaged pixel pitch for the imaging module, and the redundancy R represents the number of mirrors addressing the given point on the build plane.

10. The three-dimensional printing system of claim 9 wherein s=S*r, whereby S is a physical pitch of the mirrors and r is an optical reduction or expansion of a projection of the mirrors onto the build plane.

11. The three-dimensional printing system of claim 9 wherein M and N are each at least equal to 500.

12. The three-dimensional printing system of claim 9 wherein individual ones of the mirrors transition between OFF and ON states during a dark state between selected ones of the pulses to maximize a contrast ratio at the build plane.

13. The three-dimensional printing system of claim 9 wherein the radiation pulses each have a duration $\delta T$ and a period T of at least two times $\delta T$.

14. The three-dimensional printing system of claim 13 wherein T is at least five times $\delta T$.

15. A method of fabricating a three-dimensional article using the three-dimensional printing system according to claim 1, the method comprising:
   disposing a layer of the build material at the build plane;
   scanning the imaging module over the build plane at the velocity V; and
   while scanning the imaging module:
      illuminating the mirror array with the pulsed light source outputting the radiation pulses so that during the single scan of the imaging module the given point on the build plane is addressed by the plurality of different ones of the mirrors according to the redundancy R; and
      operating the mirror array to selectively image the build material at the build plane by controlling individual ones of mirrors to have one of the ON and OFF states during each of the pulses.

16. The method of claim 15 wherein the radiation pulses each have a duration $\delta T$ and a period T of at least two times $\delta T$.

17. The method of claim 16 wherein T is at least five times $\delta T$.

18. The method of claim 15 wherein during the single scan the given point on the build plane is addressed by at least 10 of the mirrors.

19. The method of claim 15 wherein the redundancy R represents the number of mirrors addressing the given point on the build plate, and wherein for a given scan of the imaging module, the given point on the build plane is addressed by R mirrors with a fraction of the R mirrors in the ON state providing the gray levels for curing at the given point.

20. The method of claim 15 wherein the mirrors of the mirror array transition between ON and OFF states during a dark state of the pulsed light source temporally between selected ones of the pulses.

* * * * *